Aug. 29, 1939.   M. KLAVIK   2,171,091
STREAMLINE BODY FOR MOTOR VEHICLES WITH AIR-COOLED REAR ENGINES
Filed Aug. 6, 1938
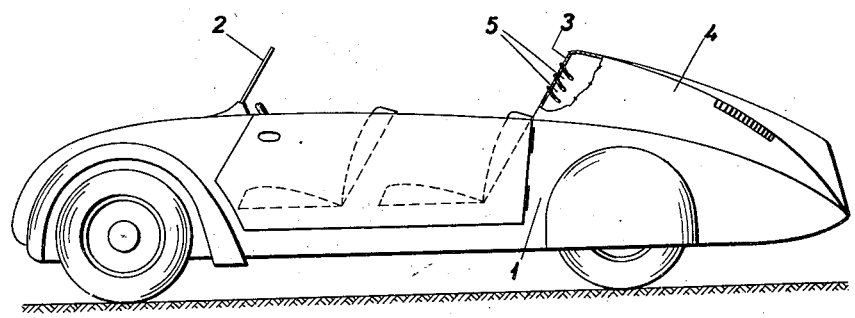
Inventor
Milos Klavik
By B. Singer, Atty.

Patented Aug. 29, 1939

2,171,091

UNITED STATES PATENT OFFICE 2,171,091

STREAMLINE BODY FOR MOTOR VEHICLES WITH AIR-COOLED REAR ENGINES

Miloš Klavik, Koprivnice, Czechoslovakia

Application August 6, 1938, Serial No. 223,546
In Czechoslovakia August 12, 1937

1 Claim. (Cl. 180—54)

The invention relates to a body for motor vehicles with air-cooled rear engines, more particularly to the type of body known as a sports body which is not generally fitted with a roof or only a collapsible (folding) hood.

In streamline bodies, it is important that the air flow should not be disturbed anywhere by projections or openings in the body, because in this way eddies are formed which always result in an increase in the resistance to travel. Therefore, these bodies are generally made entirely closed and smooth. In an open body, an eddy directed towards the open interior of the body is formed behind the windscreen in front of the driver. Even though the back of the open space for the passengers is raised to approximately the same height as the windscreen in front of the driver, the said eddy is transmitted beyond the back and disturbs the streaming airflow along the surface of the closed rear part of the vehicle.

According to the invention, this disadvantage is obviated by providing the back, which is situated behind the open space for the occupants, with one or more slot openings, through which the air set in eddy motion behind the windscreen can enter the rear part of the body where it is supplied to the fans provided for cooling the engine. This arrangement not only eliminates the disadvantage caused by the interruption of the closed streamline form of body, but also provides a more satisfactory supply of cooling air to the rear engine which, in streamline bodies of rear-engine vehicles forms one of the problems that are rather difficult to solve.

A constructional example of a body according to the invention is shown in the accompanying drawing.

The lower part 1 of the open streamline body is provided with a windscreen 2 in front of the driver and possesses behind the seats an elevated partition or back 3 which confines the closed engine chamber of the vehicle, said chamber being provided with the engine cover 4. The back 3 is provided with slot openings 5 allowing the eddy air current to enter the chamber under the cover 4, where said air assists in cooling the engine. Of course, the openings 5 are arranged in the back at the most favourable places so that the occupants will not be inconvenienced by draughts.

I claim:

An open streamline body for motor vehicles with air-cooled rear engine comprising a closed engine chamber, seats, a partition closing off said engine chamber from said seats, and a windscreen situated in front of the driver, the said partition being raised substantially to the height of the windscreen and provided with slot openings therein, through which slots the air set in eddy motion by the windscreen passes into the closed engine chamber for cooling the engine.

MILOŠ KLAVIK.